(12) United States Patent
Kopelman

(10) Patent No.: US 7,808,760 B2
(45) Date of Patent: Oct. 5, 2010

(54) ELECTRICAL FIRE PREVENTION FROM OVER-TEMPERATURE CONDITIONS

(76) Inventor: Robert Z. Kopelman, 250 N. Village Ave., Apt. C23, Rockville Centre, NY (US) 11570

( * ) Notice: Subject to any disclaimer, the term of this patent is extended or adjusted under 35 U.S.C. 154(b) by 640 days.

(21) Appl. No.: 11/787,864

(22) Filed: Apr. 17, 2007

(65) Prior Publication Data

US 2008/0013239 A1    Jan. 17, 2008

Related U.S. Application Data

(60) Provisional application No. 60/786,725, filed on Apr. 17, 2006, provisional application No. 60/786,726, filed on Mar. 28, 2006.

(51) Int. Cl.
*H02H 5/00* (2006.01)
(52) U.S. Cl. ....................... 361/103
(58) Field of Classification Search ............... 361/103
See application file for complete search history.

(56) References Cited

U.S. PATENT DOCUMENTS

| 3,740,613 | A | * | 6/1973 | Strachan ................. 361/27 |
| 4,255,655 | A | * | 3/1981 | Kikuchi ................ 250/231.11 |
| 4,372,693 | A | * | 2/1983 | Lutz ..................... 374/111 |
| 4,537,560 | A | | 8/1985 | Emeterio et al. |
| 5,262,749 | A | | 11/1993 | Kopelman |
| 5,825,602 | A | | 10/1998 | Tosaka et al. |
| 5,995,350 | A | | 11/1999 | Kopelman |
| 6,049,143 | A | | 4/2000 | Simpson et al. |
| 6,477,021 | B1 | | 11/2002 | Haun et al. |
| 6,707,652 | B2 | | 3/2004 | Engel |
| 6,802,747 | B1 | | 10/2004 | Orange |

(Continued)

FOREIGN PATENT DOCUMENTS

DE          550 863 C       5/1932

(Continued)

OTHER PUBLICATIONS

PCT International Search Report for PCT/US/2007/009433 dated Dec. 20, 2007.

(Continued)

*Primary Examiner*—Stephen W Jackson
(74) *Attorney, Agent, or Firm*—Tutunjian & Bitetto, P.C.

(57) ABSTRACT

An electrical device including a heat sensing circuit interrupter to enable a load to be selectively coupled to or disconnected from a power source in accordance with a level of a sensed temperature includes a relay assembly operable between a closed state when the sensed temperature is below a predetermined limit temperature, thereby enabling the coupling of the load to the power source, and an open state when the sensed temperature is above the predetermined limit temperature, thereby electrically disconnecting the load from the power source. The device further includes a sensor assembly including a light source operatively associated with a light sensor. The light sensor is configured to be sensitive to specific levels of the sensed temperature and the light source is configured to emit light along a plurality of optical paths at any one of a plurality of wavelengths sensitive to temperature. The light sensor is further configured to sense temperature at any one of a plurality of operating points on the electrical device and trigger the relay assembly between the closed state and the open state.

11 Claims, 2 Drawing Sheets

U.S. PATENT DOCUMENTS

| | | |
|---|---|---|
| 6,948,846 B2 | 9/2005 | Engel |
| 2005/0212646 A1 | 9/2005 | Watchorn |
| 2006/0028316 A1 | 2/2006 | Fabian et al. |

FOREIGN PATENT DOCUMENTS

| | | |
|---|---|---|
| FR | 2 312 767 A1 | 12/1976 |
| GB | 2 292 850 A | 3/1996 |
| GB | 2393043 A | 3/2004 |
| JP | 61 014529 A | 1/1986 |
| WO | WO 97/03480 | 1/1997 |

OTHER PUBLICATIONS

PCT Notification of Transmittal of the International Search Report and the Written Opinion of the International Searching Authority for PCT/US2007/007596, dated Sep. 10, 2007.

* cited by examiner

ELECTRICAL FIRE PREVENTION FROM OVER-TEMPERATURE CONDITIONS

This application claims priority from U.S. Provisional Patent Application Ser. No. 60/786,725 filed on Apr. 17, 2006 entitled "Electrical Fire Prevention from Over-temperature Conditions," the entire contents of which are incorporated herein by reference.

This application also claims priority from U.S. Provisional Patent Application Ser. No. 60/786,726 filed on Mar. 28, 2006 entitled "Prevention of High Resistance Electrical Connections," the entire contents of which are incorporated herein by reference.

BACKGROUND

1. Technical Field

The present disclosure relates to an electrical safety device. More particularly, the invention relates to a temperature sensitive and controlled circuit interrupting device that is arranged to electrically disconnect a load from a power source with the occurrence of an over-temperature event associated with the delivery of power from the power source to the load.

2. Background of Related Art

The device of the present disclosure is configured with a relay that is operable between a closed position or closed state when the over-temperature problem area is sufficiently cooled, and an open position or open state when the temperature of the relay, or equivalently packaging the relay is housed in, is above a predetermined limit temperature. An over-temperature event of these devices may require manual resetting to again enable power to be coupled to a load. Manually resetting the load may require shutting off the power supplying the load.

However, with reference to conventional devices, the temperature controlled relay may only be electrically and/or mechanically coupled to a 'hot' or power sourcing conductor. Accordingly, there is a possibility that heat generated by other conductors (or related structures and current carrying means) may not be appropriately sensed due to their physical location and possibly due to the nature of the electrical connections of the temperature controlled relay. It is important to understand that when referring to the sensing of heat produced by the flow of heat, such sensing may be realized in several possible ways. Namely, either by indirect thermal conduction through convection or heat flow through a non-current carrying thermal conductor or through a direct coupling.

Therefore, when considering conventional circuit interrupters, there is currently lacking a simple and cost effective arrangement to thermally sense and monitor the heat produced by any of a plurality of current carrying means (e.g., conductors, female prongs, terminal screws, etc.) to determine if the temperature of any one of said means has risen above a predetermined limit. For example, an elevated temperature level may be caused by a poorly formed resistive contact and/or an excessive current flow of a neutral conductor or a ground, or even a high resistance grounding condition.

It is therefore an object of the present disclosure to effect the coupling of a load to a suitable power source, or alternately, to disconnect the load from the power source should an 'over-temperature' (and/or over-current) event associated with the delivery of power from the power source to the load occur.

SUMMARY

The present disclosure provides for a temperature sensitive and controlled circuit interrupting device configured to disconnect a load from a power source with the occurrence of an over-temperature event at any one or more points along a circuit associated with the delivery of power from the power source to the load.

The present disclosure further relates to a heat sensing circuit interrupter configured to enable a load to be selectively connected to or disconnected from a power source in accordance with a level of a sensed temperature. The circuit interrupter includes a relay assembly operable between a closed state when the sensed temperature is below a predetermined limit temperature, thereby enabling the coupling of the load to the power source, and an open state when the sensed temperature is above the predetermined limit temperature, thereby electrically disconnecting the load from the power source. The circuit interrupter further includes a sensor assembly including a light source operatively associated with a light sensor. The light sensor is configured to be sensitive to specific levels of the sensed temperature and the light source is configured to emit light along a plurality of optical paths at any one of a plurality of wavelengths sensitive to temperature. The light sensor is further configured to sense temperature at any one of a plurality of operating points on the electrical device and trigger the relay assembly between the closed state and the open state.

BRIEF DESCRIPTION OF THE DRAWINGS

Various embodiments of the present disclosure are described herein with reference to the drawings wherein.

DETAILED DESCRIPTION

Particular embodiments of the present disclosure are described hereinbelow with reference to the accompanying drawings. In the following description, well-known functions or constructions are not described in detail to avoid obscuring the present disclosure in unnecessary detail.

The present disclosure provides for a temperature sensitive and controlled circuit interrupting device configured to disconnect a load from a power source with the occurrence of an over-temperature event at any one or more points along a circuit associated with the delivery of power from the power source to the load.

Figure 1:
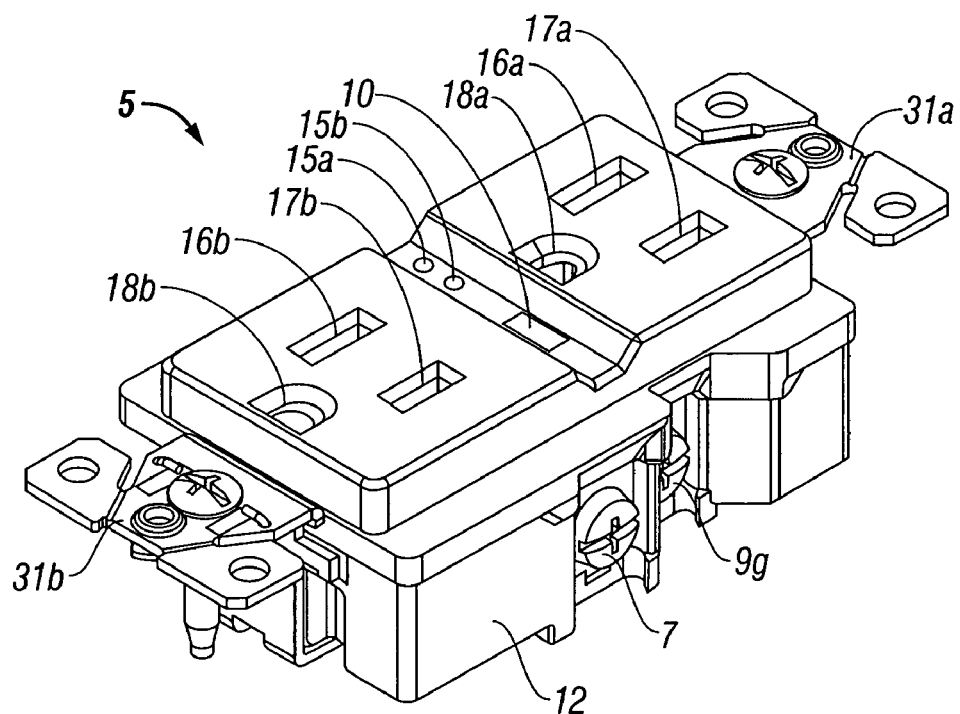
FIG. 1 is a three-dimensional view of an electrical receptacle in accordance with embodiments of the present disclosure.

Referring to FIG. 1, an electrical receptacle 5 including an outlet is shown. The circuit interrupting device of the present disclosure is configured to sense the operating temperature of electrical devices and/or circuits such as, for example, electrical receptacle 5. More particularly, the circuit interrupting device of the present disclosure is configured to sense the operating temperature at any one of a plurality of specific locations (or "operating points") on electrical devices and/or circuits utilizing a light sensor such as, for example, infrared light, light transmitted by fiber optics, etc., and automatically turn off when the temperature rises above a predetermined threshold. Examples of operating points include, but are not limited to, the termination terminals and female outlet receptacles of electrical receptacle 5. As to be appreciated, the previously mentioned operating points of electrical receptacle 5 are illustrative only and operating points of other electrical devices may also be designated for temperature sensing by embodiments of the present disclosure. A reset button, indicated in FIG. 1 as 10, may be included and configured for manual operation to enable operation of electrical devices and/or circuits to resume. For example, following either a manual shutoff or an automatic shutoff due to an over-temperature condition sensed within or on receptacle 5, manual operation of reset button 10 will resume operation of receptacle 5.

As will become apparent upon review of the present disclosure, the example of FIG. 1 using receptacle 5 is for illustrative purposes only and the present disclosure may be employed with any electrical device and/or circuit that may be prone to over-temperature and/or over-current conditions such as, for example, switches, extension cords, adapters (current taps), power strips, plug molds, and the like.

FIG. 1 is a three-dimensional view of an electrical receptacle 5 in accordance with embodiments of the present disclosure. Receptacle 5 has a top outlet and a bottom outlet secured in mated relation to an enclosure 12. The outlets may be secured to enclosure 12 by any well-known means such as ultrasonic heating, fasteners (not shown), etc. The outlets may be formed of any material which inherently provides high temperature stability such as, for example, thermoplastic plastic. For reasons that will become apparent upon further reading of the present disclosure, enclosure 12 may further include a plurality of reflective surfaces therein such as, for example, able to reflect light at wavelengths suitable for temperature sensing such as, for example, infrared light (or radiation). Each outlet is adapted to receive a 3-prong plug comprising a neutral (N) terminal, a load (L) terminal and a ground terminal for receiving the prongs of a male electrical plug, or a 2-prong plug comprising a neutral terminal and a load terminal. Specifically, the top outlet has neutral slot 16A, live slot 17A and ground slot 18A, while the bottom outlet has neutral slot 16B, live slot 17B and ground slot 18B. Screw 7 indicates the line terminal, screw 9G indicates the feed-through terminal, a screw (not shown) on the occluded side of receptacle 5 indicates the neutral terminal, and mounting tabs 31A, 31B are provided. Typically, electrical receptacles are connected in parallel via the household wiring. Generally, the line terminal serially couples to a thermal interrupt which serially couples to the feed (load) terminal.

As is typical in the art, reset button 10 may be located, for example, between the top outlet and the bottom outlet of receptacle 5. In operation, the top of reset button 10 is substantially flush with the receptacle packaging. A relay assembly, discussed in detail below, may be located between the line terminal of the receptacle and the live terminals of the outlets. The relay assembly functions to interrupt the contact between the household wiring and the portion of the receptacle in contact with the prongs of the male electrical plug (not shown) inserted into the top outlet or the bottom outlet. As to be appreciated, the relay assembly also prevents power from reaching any downstream outlets connected via the household wiring; downstream outlets are assumed to be on the feed (load) side. Reset button 10 may include an internal spring (not shown) located at its base that is configured to bias reset button 10 outward from the receptacle packaging. When the relay assembly triggers, reset button 10 pops outward and/or is biased outward by the spring so that the top of reset button 10 is no longer flush with the receptacle packaging.

Manually depressing reset button 10, when the temperature is sufficiently cool, compresses the spring and returns reset button 10 to its substantially flush configuration and the relay assembly to its reset condition.

Figure 2:
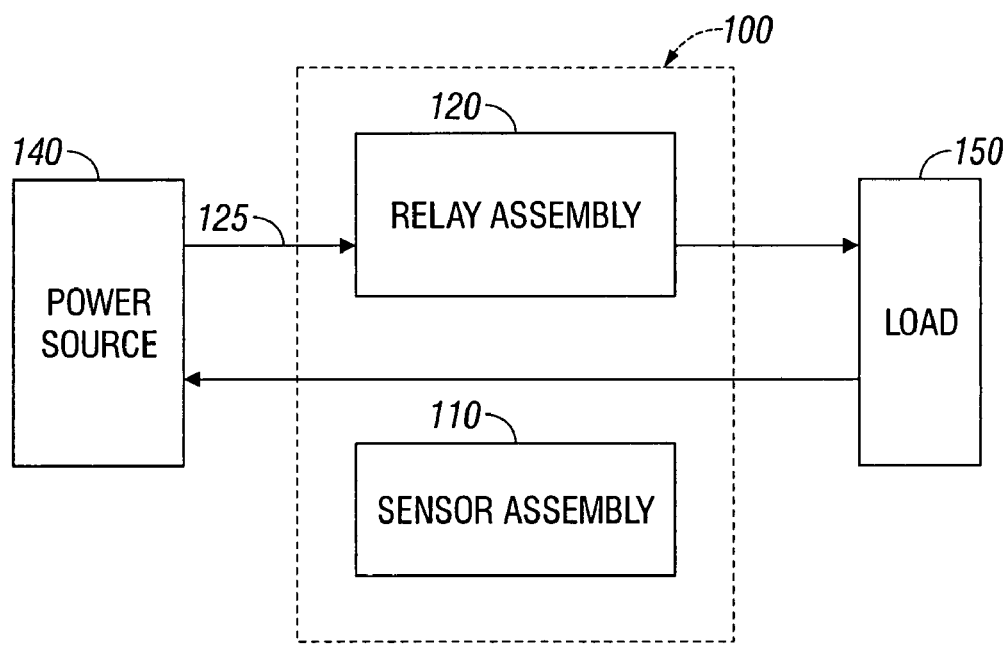
FIG. 2 is a high-level block diagram in accordance with embodiments of the present disclosure.

Referring now to FIG. 2 in conjunction with FIG. 1, a high-level block diagram is shown illustrating embodiments of a circuit interrupting device 100 in accordance with the present disclosure. As shown, device 100, which may be termed a heat sensing circuit interrupter or a temperature controlled circuit interrupter, is interposed in-line between a load 150 and a power source 140. At lest one current carrying conductor 125 connects the load 150 and power source 140. As is typical in the art, current carrying conductor 125 may include, for example, hot, neutral, and ground conductors (not explicitly shown). In the example of receptacle 5 illustrated in FIG. 1, circuit interrupting device 100 may be secured within enclosure 12 and be configured to operate in cooperative relation with receptacle 5 to prevent over-temperature conditions, as will be discussed in further detail below.

With continued reference to FIG. 2 in conjunction with FIG. 1, device 100 includes a sensor assembly 110 configured to utilize light at a wavelength suitable for temperature sensing such as, for example, infrared light to sense temperature conditions at any one or more of a plurality of operating points on an electrical device and/or electrical circuit that are typically prone to such conditions. Examples of such operating points include, but are not limited to, terminals 7 and 9G and female receptacles 16A, B and 17A, B of receptacle 5 (FIG. 1). Sensor assembly 110 may further be configured to communicate or transmit, for example, via electrical, electronic, and/or send a signal to a remote location (e.g., a receiver, an interface, etc.) for monitoring over existing power lines or through wireless signals (e.g., WiFi networks, Bluetooth, etc.) temperature conditions sensed at any one or more operating points of receptacle 5 to a means for interrupting current from power source 140 to load 150, as will be discussed in further detail below. In this manner, sensor assembly 110 may act as a temperature monitor for the electrical device and/or circuit in which it is employed.

Circuit interrupting device may further include a relay assembly 120 configured to allow or interrupt current from power source 140 to load 150 based upon communications received from sensor assembly 110. For example, sensor assembly 110, upon sensing an over-temperature condition within or on receptacle 5, may transmit a signal (not explicitly shown), e.g., electrical, mechanical, electronic, etc. to notify relay assembly 120 of such condition. The signal triggers relay assembly 120 to automatically shutoff receptacle 5, i.e., interrupt current from power source 140 to load 150 indefinitely or until a user resets receptacle 5 once the problem causing the over-temperature condition has been resolved. Relay assembly 120 may further include an indicator means 130 configured to provide an indication that a dangerous over-temperature condition has occurred and/or the electrical device has been shut off, as will be discussed in further detail below. Relay assembly 120 may also send a signal to a remote location (e.g., a receiver, an interface, etc.) for monitoring over existing power lines or through wireless signals (e.g., WiFi networks, Bluetooth, etc.). In this manner, relay assembly 120 may act to turn off the electrical device and/or circuit in which it is employed before a dangerous condition ensues such as, for example, a fire caused by an undetected over-temperature condition at a specific location within or on receptacle 5.

Sensor assembly 110 will now be discussed in detail with reference to FIG. 3. Sensor assembly 110 may include a light sensor 114a in operative association with a light source 114b.

Light source 114b may be configured to produce light at any one of a plurality of wavelengths suitable for temperature sensing such as, for example, infrared light. The infrared spectrum range used for infrared temperature measurement is well known in the art. In accordance with embodiments of the present disclosure, light source 114b may be any device suitable to produce infrared light such as, for example, a thermal emitter, infrared lamp, light emitting diode ("LED"), super luminescent diode ("SLD"), pyroelectric, thermal pile detector, etc. In yet other embodiments of the present disclosure, light source 114b may be used in conjunction with optical fiber configured to transmit temperature sensitive light. It should be understood that sensor assembly 110 including a light source and light sensor is illustrative only and sensor assembly 110 may employ any means of sensing temperature within or on an electrical device and/or circuit. For example, electrical circuits wired with temperature sensitive cable such as a linear heat sensor (not explicitly shown) may be configured to detect heat over the entire length of a circuit. Other temperature sensing means are contemplated for use in sensor assembly 110 such as, for example, resistive temperature devices configured to exhibit changes in resistance with changes in temperature. Examples of resistive temperature devices that may be employed for use in the present disclosure include, but are not limited to, temperature sensors utilizing thin film technology, surface sensors, wireless sensors, etc.

Figure 3:
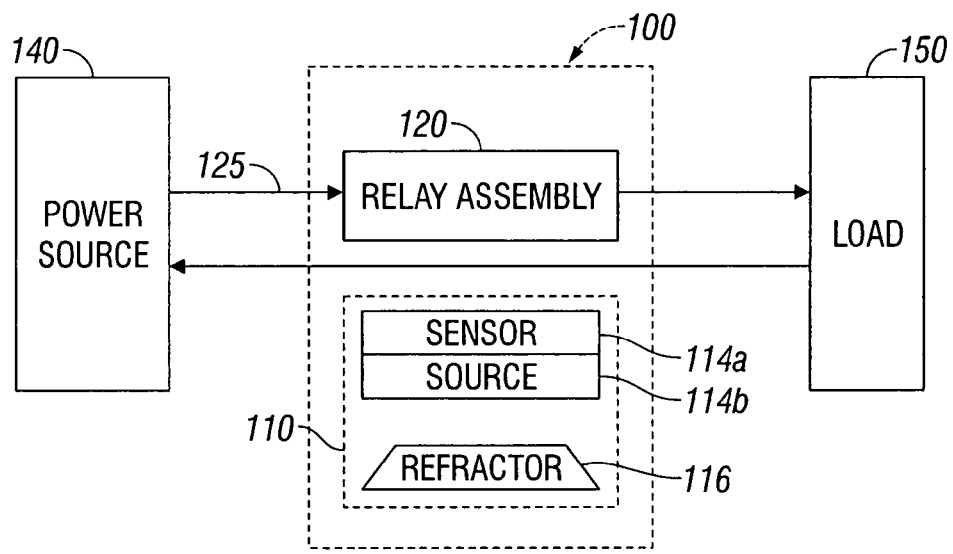
FIG. 3 provides a more detailed block diagram of components of the present disclosure in accordance with FIG. 1.

With continued reference to FIG. 3 in conjunction with FIG. 1, light produced by light source 114b may transmit along any one of a plurality of optical paths (not explicitly shown) along or through specific locations or operating points of an electrical device and/or circuit such as, for example, terminals 7 and 9G and female receptacles 16A, B and 17A, B of receptacle 5 (FIG. 1). As would be appreciated by those skilled in the art, not all specific locations or operating points of a given electrical device and/or circuit may be within a direct path or line of sight of light source 114b. As identified in FIG. 3, sensor assembly 110 may include a light refractor 116 configured to redirect and/or refract light emitted from light source 114b along optical paths that are not within a direct path or line of sight of light source 114b. Light refractor 116 may be, for example, a prism and/or a thin array of prisms formed from angled grooves on a planar, transparent material capable of refracting light in a plurality of directions.

It is further contemplated that electrical devices and/or circuits that employ embodiments of the present disclosure include reflective material and/or surfaces (not explicitly shown) such as, for example, mirrors configured to act cooperatively with light source 114b and/or refractor 116 to reflect light along optical paths not within a direct path or line of sight of light source 114b and/or refractor 116. For example, receptacle 5 (FIG. 1) may include mirrored surfaces (not explicitly shown) within enclosure 12 as components configured to be positioned at a desired angle and/or location whereby light is reflected along optical paths directed at specific locations of receptacle 5. Additionally or alternatively, specific components of electrical devices and/or circuits that employ embodiments of the present disclosure may be formed of a reflective material, i.e., be inherently reflective, at least on one side thereof, configured to reflect light along a plurality of optical paths to anywhere within or on such device and/or circuit. For example, the interior surface of enclosure 12 (FIG. 1) may be formed of a reflective material such as, for example, mirrors to reflect light along a plurality of optical paths. In this manner, a reflective component and/or surface may act in an auxiliary capacity to increase the number of specific locations monitored for temperature conditions within an electrical device and/or circuit due to the increase of optical paths monitored by sensor assembly 110.

With returning reference to FIG. 3, light sensor 114a is configured in operative association with light source 114b. Upon detection of an over-temperature condition, light sensor 114a is configured to communicate with relay assembly 120 via a signal (not explicitly shown), e.g., electrical, electronic, mechanical, etc. that notifies relay assembly 120 that an over-temperature condition has been sensed. In embodiments, light source 114b may be embodied as optical fiber. In this case, any sensor suitable to receive and interpret electromagnetic carrier waves emitted by the optical fiber may be employed such as, for example, a fiber optic receiver. In other embodiments, light source 114b may be embodied to emit infrared light. In this case, light sensor 114a may be any optics device suitable for detection of the infrared light band (e.g., 0.7-14 microns). Such devices include, but are not limited to, a pyroelectric infrared detector ("PIR"), a photodetector, an infrared thermometer, etc. As would be appreciated by those skilled in the art, the intensity of an operating point's emitted infrared energy increases or decreases in proportion to its temperature. It is the emitted energy measured that indicates the operating point's temperature. The emitted energy comes from an operating point and reaches the infrared sensor through its optical system, which focuses the energy onto one or more photosensitive detectors. The detector then converts the infrared energy into an electrical signal, which may in turn be converted into a temperature value. This temperature value or signal is configured to trigger relay assembly 120 to automatically interrupt current from power source 140 to load 150, as will be discussed in further detail below.

Figure 4:
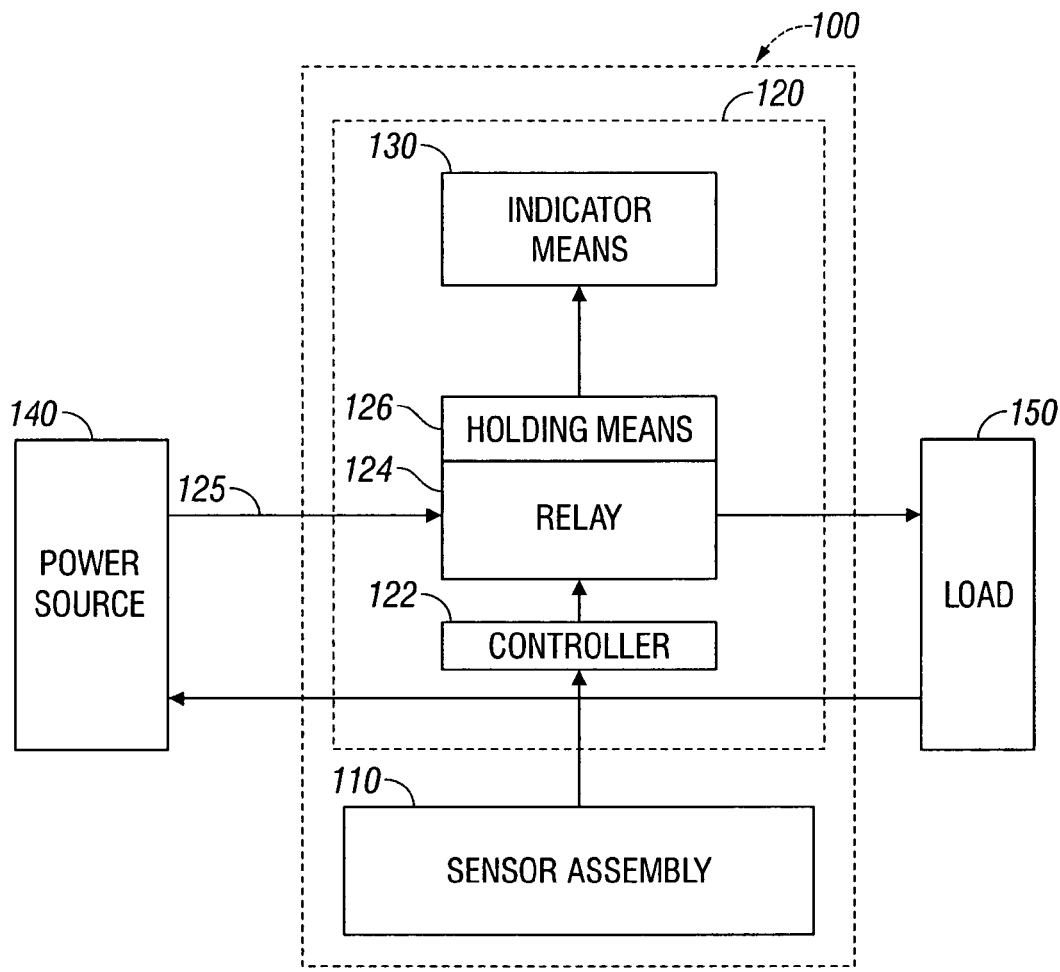
FIG. 4 provides a more detailed block diagram of components of the present disclosure in accordance with FIG. 1.

Referring to FIG. 4, relay assembly 120 is operatively associated with sensor assembly 110 and includes a controller 122 configured to trigger relay assembly 120 to interrupt current from power source 140 to load 150 via a relay 124 upon receipt of a signal or temperature value from light sensor 114a (FIG. 3). As to be appreciated, relay 124 may be, for example, a thermal relay switch or a relay of any well-known type suitable for interrupting a circuit. For example, when a sensed temperature (as sensed by light sensor 114a) increases or rises above a predetermined limit temperature, the relay opens. Similarly, if the sensed temperature level is below the limit temperature, relay 124 is closed. When closed or in a closed state, relay 124 enables load 150 to be coupled to power source 140. When open, or in an open state, relay 124 causes load 150 to be effectively disconnected from power source 140. It should be noted that the predetermined limit temperature may actually be provided as a temperature limit 'pair' wherein the temperature controlled relay opens at a first temperature, and closes (again) at a second, possibly lower temperature, thereby possibly including a hysteresis characteristic. Further, it should be understood that in accordance with the present disclosure, "closed" or "closed state" should be interpreted as "normal-open" and "open" or "open state" should be interpreted as "normal-closed", as would be understood by those skilled in the art.

It should be understood that embodiments of the present disclosure may employ means other than relay assembly 120 to interrupt current from power source 140 to load 150. For example, any device configured for circuit protection may be employed such as, for example, polymeric positive temperature coefficient ("PPTC") devices (not explicitly shown) that are capable of providing over-current and over-temperature protection in a single component. In embodiments of the present disclosure, PPTC devices may be used in any electrical device and/or circuit prone to over-temperature and/or over-current conditions. For example, a PPTC device may be embedded within or on an adapter, an extension cord, a switch, etc. and other well known electrical devices and/or circuits. Other advantages of PPTC devices include resettable functionality and latching capabilities. Other circuit protection devices are also contemplated for use with the present disclosure such as, for example, ceramic positive temperature coefficient (CPTC) devices, computer and/or remote controlled automation systems that may employ, for example, wireless technology, Bluetooth technology, frequency transmission through existing power lines, etc. configured to monitor a plurality of electrical devices and/or circuits on a single or consolidated interface.

It is important to realize that the source of heat sensed by sensor assembly 110, which may result in an over-temperature event, may be caused by any of a number of circumstances or occurrences. Examples include poor contacts or connections, inadequate conductor gauge (i.e., not able to carry the required current to properly energize load 150), or a malfunction of the load itself (causing excessive over-current flow therethrough).

As seen in FIG. 4, embodiments of relay assembly 120 may include a holding means 126, in addition to controller 122 and relay 124. Holding means 126 is included to hold relay 124 in the open position, even when the heat source that caused the initial over-temperature event has been eliminated (or significantly reduced and allowed to cool). In embodiments, relay 124 is returned to the closed position or closed state by a reset action. As skilled persons will appreciate, there are a number of suitable arrangements that may be provided to embody the holding means 126 of the present disclosure. Although specific embodiments and arrangements will be discussed, these should not be interpreted to be limiting or excluding other possible holding arrangements. Any suitable holding arrangement will simply hold relay 124 in an open position until a reset action occurs.

Embodiments of relay assembly 120 may further include an indication mechanism 130. When an over-temperature event occurs and relay 124 opens, load 150 is disconnected from power source 140. An indication or annunciation of this occurrence will be very helpful. For example, when an indication of relay 124 being opened is not provided, individuals that notice load 150 is not energized may attempt to 'fix' or correct the problem. This misguided effort may be frustrating, and possibly even dangerous. Accordingly, the inclusion of an indication mechanism 130, which may be provided in a number of embodiments, will definitively indicate when the load has been electrically disconnected from the power source as a result of the sensed temperature rising above the predetermined limit temperature (possibly due to an over-current event and/or a glowing connection). Further, the indication mechanism may readily indicate to those familiar with circuit interrupter 100, the need to disconnect the circuit interrupter from power source 140 to enable the over-heated problem area to cool and return relay 124 to the closed state. Indication mechanism 130 may further be embodied to indicate the existence or nonexistence of other potentially dangerous conditions associated with an electrical device such, for example, incorrect wiring, reverse polarity, an ungrounded device, or even correct wiring and/or proper grounding, etc. Appropriate indicator means 130 may be, for example, an audio indicator (not explicitly shown) that may be energized via a voltage developed across holding means 126. This voltage is the result of relay 124 assuming the open position, and is reduced to near zero when relay 124 is in the closed position. It may be noted that an audio or light emitting annunciation may be provided as either a continually or intermittently activated indicator means 124 (to alert nearby persons).

Embodiments of the present disclosure may further include additional types of display and indicator means 130, which may be configured to be readily observable by persons in the vicinity of circuit interrupting device 100. For example, a temperature indicating means may be included to enable an individual to note or monitor the temperature of circuit interrupting device 100. Accordingly, as a function of the specific temperature determining components included, a housing temperature, the internal air temperature, the temperature of light sensor 114a, or the temperature of relay 124, may be indicated. In certain embodiments of the present disclosure, a chemical based 'bar-graph' kind of a temperature display may be included. Displays of this type are configured with a plurality of adjacent, typically independent, linearly arranged elements (e.g., an array) that provide a graduated scale for, in this case, temperature indication. Such a display may be provided to clearly indicate the approximate temperature of circuit interrupting device 100 (or a housing thereof). Bar-graph displays, as well as others suited to the invention, are well known to skilled persons. Other examples of display and indicator means may include one or more of a current (amp) meter, voltmeter, wattmeter, an over or under voltage annunciator, an audio sounder, etc.

Other indicators are contemplated and may be employed with the present disclosure to embody indication mechanism 130 such as, for example, a light emitting indicator. As shown in FIG. 1, one or more light emitting indicators 15a and 15b may be employed on an electrical device such as, for example, receptacle 5 and each be configured to emit light of a color different than the other. For example, 15a may be configured to emit a green light to signify safe temperature conditions within and on receptacle 5. Conversely, 15b may be configured to emit a red light to signify an over-temperature condition within or on receptacle 5. In embodiments, a single light emitting indicator is also contemplated and may be configured to emit light of a certain color (e.g., red, green) only upon occurrence of a particular condition or status of the electrical device, e.g., safe temperature or over-temperature conditions.

Another indicator contemplated by the present disclosure to embody indication mechanism 130 may be, for example, use of heat sensitive polymers that are configured to change color at various temperatures. For example, an electrical device and/or circuit could be formed of or include a component formed of such a heat sensitive polymer. Upon occurrence of a dangerous condition such as, for example, overheating, the polymer would change color to distinctly indicate the existence of the dangerous condition.

Yet another indicator contemplated by the present disclosure to embody indication mechanism 130 may be, for example, odor and/or smell configured to arouse the olfactory senses of a person in the proximity of the dangerous condition. For example, a smell may be released from an electrical device and/or circuit in an overheating state. Means for releasing the smell may include, for example, spraying, fogging, or even heating an insert configured to release smell at a certain temperature. In this configuration, heat may be supplied from an overheating condition on the device and/or circuit or even from a PPTC device.

As skilled persons will appreciate, circuit interrupting device 100 may be physically embodied in a variety of forms. For example, the invention may be provided internal to an electrical device such as, for example, receptacle 5 (FIG. 1), or within an electrically conductive means coupling load 150 to power source 140. It is further contemplated that the present disclosure may in embodiments be provided for use in extension cords, conduits, electrical troughs, conductors within conduit, etc., as would be understood by those skilled in the art. It is further contemplated that the present disclosure may in embodiments be provided as an adapter like device including a housing supporting a male plug and a female socket (e.g., a current tap), which is situated in-line with power coupling means. Yet other physical embodiments of the circuit interrupting device 100 may be provided by skilled artisans in many forms and configurations in accordance with the present disclosure.

The present disclosure has been described with respect to a duplex receptacle. In another embodiment, the present disclosure may be applied in a wall adapter outlet. Specifically, a portable unit having duplex outlets with thermal interrupt protection is plugged into a wall receptacle having duplex outlets lacking thermal interrupt protection.

In yet another embodiment, the present disclosure is applied in a power strip comprising a plurality of receptacles, the power strip being plugged into a standard outlet. As to be appreciated, a single relay assembly may be employed to monitor and protect the entire strip.

In yet another embodiment, the present disclosure is applied in a multi-outlet plug mold strip, the plug mold being plugged into a standard outlet or alternatively have a separate feed. The plug mold has a plurality of individual outlet receptacles in spaced relation to each other along a strip. A single sensor and relay in accordance with embodiments of the present disclosure may be provided to monitor temperature conditions throughout the plug mold and protect one or more contacts to shut down incoming phases of circuitry. Additionally or alternatively, sensor and relay assemblies in accordance with the present disclosure may be provided within or substantially adjacent each outlet receptacle along the strip.

As would be understood by those skilled in the art, the present disclosure may be applied to any well known device prone to over-temperature conditions such as, for example, any type of switch, extension cords, adapters (or current taps), ground fault interrupts (GFI), etc.

Although an illustrative embodiment of the present disclosure, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An electrical device including a heat sensing circuit to enable a load to be selectively coupled to or disconnected from a power source in accordance with a level of a sensed temperature, the circuit comprising:

a relay assembly operable between a closed state when the sensed temperature is below a predetermined limit temperature, thereby enabling the coupling of the load to the power source, and an open state when the sensed temperature is above the predetermined limit temperature, thereby electrically disconnecting the load from the power source; and a sensor assembly including a light source operatively associated with a light sensor, the light sensor being configured to be sensitive to specific levels of the sensed temperature, the light source being configured to emit light along a plurality of optical paths at any one of a plurality of wavelengths sensitive to temperature, wherein the light sensor is configured to sense temperature at any one of a plurality of operating points on the electrical device and trigger the relay assembly between the closed state and the open state.

2. The device as in claim 1, wherein the emitted light is further refracted along any one or more of the plurality of optical paths.

3. The device as in claim 1, wherein the light source emits light within the infrared light spectrum.

4. The device as in claim 1, wherein the light source is embodied as optical fiber configured to emit light sensitive to temperature.

5. The device as in claim 1, wherein the relay assembly is maintained in the open state by heat produced by a resistive heating element proximal to the relay assembly that is energized when the relay assembly is in the open state.

6. The device as in claim 1, including a plurality of reflective surfaces configured to further reflect light emitted from light source along any one or more of the plurality of optical paths.

7. The device as in claim 1, further including an indication mechanism to indicate when the load has been electrically disconnected from the power source as a result of the sensed temperature rising above the predetermined limit temperature.

8. The device as in claim 7, wherein the indication mechanism is configured to indicate correct wiring of the electrical device.

9. The device as in claim 7, wherein the indication mechanism is configured to provide at least one of an audio, visual, or olfactory indication.

10. The device as in claim 1, wherein the sensor assembly is configured to communicate with a remote receiver for monitoring temperature.

11. The device as in claim 10, wherein the remote receiver is configured for wireless communication with the sensor assembly.

* * * * *